US010574566B2

(12) United States Patent
Djernaes

(10) Patent No.: US 10,574,566 B2
(45) Date of Patent: Feb. 25, 2020

(54) REDUCING OR ELIMINATING ROUTING MICROLOOPS IN NETWORKS HAVING A CLOS TOPOLOGY, SUCH AS DATA CENTER CLOS NETWORKS EMPLOYING THE EXTERIOR BORDER GATEWAY PROTOCOL (EBGP) FOR EXAMPLE

(71) Applicant: Juniper Networks, Inc., Sunnyvale, CA (US)

(72) Inventor: Martin Djernaes, Roskilde (DK)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/990,560

(22) Filed: May 25, 2018

(65) Prior Publication Data

US 2019/0363975 A1 Nov. 28, 2019

(51) Int. Cl.
*H04L 12/28* (2006.01)
*H04L 12/703* (2013.01)
(Continued)

(52) U.S. Cl.
CPC .............. *H04L 45/28* (2013.01); *H04L 45/02* (2013.01); *H04L 45/04* (2013.01); *H04L 45/18* (2013.01);
(Continued)

(58) Field of Classification Search
CPC ..... H04L 12/44; H04L 12/46; H04L 12/4616; H04L 12/56
(Continued)

(56) References Cited

U.S. PATENT DOCUMENTS 8,098,574 B2 * 1/2012 Southworth ........ H04L 49/3009
370/217
9,210,096 B2 * 12/2015 Shimokawa ............ H04L 47/56
(Continued)

OTHER PUBLICATIONS

Liao et al, "DPillar: Scalable Dual-Port Server Interconnection for Data Center Networks," *2010 Proceedings of 19th International Conference on Computer Communications and Networks (ICCCN)*, pp. 1-6 (IEEE, Piscataway, NJ, Aug. 2, 2010).
(Continued)

*Primary Examiner* — Dmitry Levitan
(74) *Attorney, Agent, or Firm* — John C. Pokotylo; Pokotylo Patent Services

(57) ABSTRACT

The problem of routing micro-loops in networks having a CLOS topology, such as data center CLOS networks employing the exterior border gateway protocol (eBGP) for example, is solved by: (a) receiving, on an interface of one of the nodes, a datagram, the datagram including destination information; (b) determining a next hop and an egress interface using (1) an identifier of the interface on which the datagram was received, (2) the destination information of the received datagram, and (3) stored forwarding information such that a routing micro-loop is avoided without discarding the datagram; and (c) forwarding the datagram via the egress interface. For example, this problem may be solved by (a) receiving, on an interface a node of the CLOS network, a datagram, the datagram including destination information; (b) looking up, using the destination information of the received datagram and stored forwarding information, a next hop egress interface on the node; (c) determining whether or not the next hop egress interface on the node is the same as the interface on which the datagram was received; and (d) responsive to a determination that the next hop egress interface on the node is the same as the interface on which the datagram was received, (1) replacing the next hop egress interface with a safe multipath next hop egress interface, and (2) forwarding the datagram via the safe multipath next hop egress interface, and otherwise, responsive to a determination that the next hop egress interface on the node is not the same at the interface on which the datagram was received, simply forwarding the datagram via the next hop egress interface.

19 Claims, 15 Drawing Sheets

(51) Int. Cl.
*H04L 12/705* (2013.01)
*H04L 12/751* (2013.01)
*H04L 12/933* (2013.01)
*H04L 12/707* (2013.01)
*H04L 12/715* (2013.01)
*H04L 12/741* (2013.01)
*H04L 12/733* (2013.01)

(52) U.S. Cl.
CPC ............. *H04L 45/20* (2013.01); *H04L 45/24* (2013.01); *H04L 45/745* (2013.01); *H04L 49/1515* (2013.01)

(58) Field of Classification Search
USPC ........................................ 370/401, 402, 408
See application file for complete search history.

(56) References Cited

U.S. PATENT DOCUMENTS

| | | | |
|---|---|---|---|
| 9,350,654 B1* | 5/2016 | Gredler | H04L 45/507 |
| 9,497,039 B2* | 11/2016 | Greenberg | H04L 12/4633 |
| 9,590,889 B2* | 3/2017 | Mahadevan | H04L 45/12 |
| 9,838,246 B1* | 12/2017 | Hegde | H04L 41/0668 |
| 9,876,715 B2* | 1/2018 | Edsall | H04L 12/4633 |
| 2013/0170504 A1 | 7/2013 | Shimokawa et al. | |
| 2015/0124817 A1* | 5/2015 | Merchant | H04L 45/74 |
| | | | 370/392 |
| 2016/0105354 A1 | 4/2016 | Mahadevan et al. | |
| 2017/0295101 A1* | 10/2017 | Hira | H04L 43/0876 |

OTHER PUBLICATIONS

Extended European Search Report to corresponding European Patent Application No. 19160188.9, dated Sep. 24, 2019 (10 pgs.).
A. Atlas, Ed., "U-turn Alternates for IP/LDP Fast-Reroute," draft-atlas-ip-local-protect-uturn-03, *Network Working Group, Internet Draft*, pp. 1-29 (The Internet Society, Feb. 2006).
P. Lapukhov, et al, "Use of BGP for Routing in Large-Scale Data Centers", *Request for Comments* 7938, pp. 1-35, (Internet Engineering Task Force, Aug. 2016).

* cited by examiner

| PREFIX | NEXT HOP | INTERFACE | SAFE MULTIPATH NEXT HOP(S) |
|---|---|---|---|
| T1 | ... | ... | ... |
| T2 | ... | ... | ... |
| T3 | ... | ... | ... |
| T4 | T4 | TL4 | ... |
|  | S1* | LS1 |  |
|  | S2* | LS2 |  |
|  | S3* | LS3 |  |
|  | S4* | LS4 |  |

| PREFIX | NEXT HOP | INTERFACE | SAFE MULTIPATH NEXT HOP(S) |
|---|---|---|---|
| T1 | ... | ... | ... |
| T2 | ... | ... | ... |
| T3 | ... | ... | ... |
| T4 | S1 | LS1 | S2, S3, S4 |
|  | S2 | LS2 | S1, S3, S4 |
|  | S3 | LS3 | S1, S2, S4 |
|  | S4 | LS4 | S1, S2, S3 |

| PREFIX | NEXT HOP | INTERFACE | SAFE MULTIPATH NEXT HOP(S) |
|---|---|---|---|
| T2 | ... | ... | ... |
| T3 | ... | ... | ... |
| T4 | E1 | LE1 | E2 |
|  | E2 | LE2 | E1 |

| PREFIX | NEXT HOP | INTERFACE | SAFE MULTIPATH NEXT HOP(S) |
|---|---|---|---|
| T1 | ... | ... | ... |
| T2 | ... | ... | ... |
| T3 | ... | ... | ... |
| T4 | E3 | LE3 | E4 |
|  | E4 | LE4 | E3 |
|  | E1* | LE1 |  |
|  | E2* | LE2 |  |

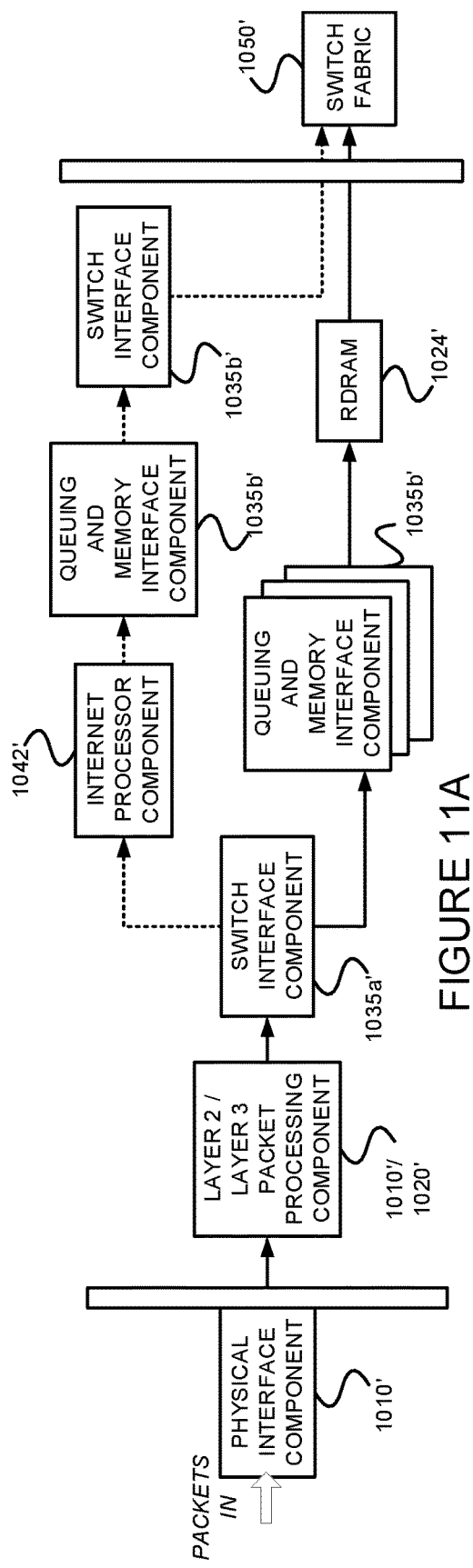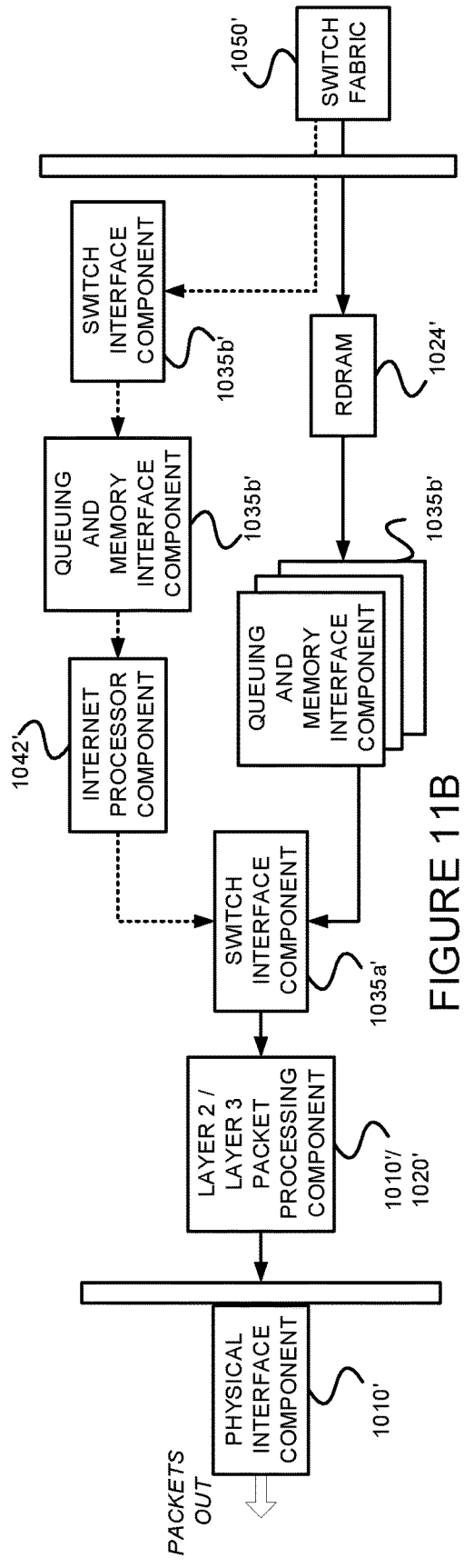
FIGURE 11A
FIGURE 11B

REDUCING OR ELIMINATING ROUTING MICROLOOPS IN NETWORKS HAVING A CLOS TOPOLOGY, SUCH AS DATA CENTER CLOS NETWORKS EMPLOYING THE EXTERIOR BORDER GATEWAY PROTOCOL (EBGP) FOR EXAMPLE

§ 1. BACKGROUND OF THE INVENTION

§ 1.1 Field of the Invention

The present disclosure concerns networks having a CLOS topology, such as networks used in data centers for allowing servers to communicate with one another. More specifically, the present disclosure concerns the potential problem of routing micro-loops in the event of a failed link (or a failed interface or a failed node terminating a link, all of which are commonly referred to as a "failed link" absent further specificity) in a CLOS network.

§ 1.2 Background Information

The trend towards using CLOS network topology in data center networks, as well as the trend towards using the exterior Border Gateway Protocol (eBGP) for routing in such networks, are described in this section. More details as to the reasons behind these trends can be found in Request for Comments 7938, "Use of BGP for Routing in Large-Scale Data Centers" (Internet Engineering Task Force (IETF), August 2016) (referred to as "RFC 7938" and incorporated herein by reference).

§ 1.2.1 Traditional Data Center Architecture

As shown in FIG. 1, in a traditional data center network architecture 100, servers 110a-110d can communicate with one another via nodes (e g, routers, switches, etc.) 122 in an "access" or "top-of-rack" (TOR) layer 120, nodes 132 in a "distribution" layer 130, and nodes 142 in a "core" layer 140. The three layers 120, 130, 140 are connected to each other via layer 2 (L2) (in the sense of the Open Systems Interconnect (OSI) seven-layer model) links. Thus, traffic flow within the network 100 is controlled mostly by L2 protocols, such as the spanning tree protocol (STP) for example.

Unfortunately, there are a number of drawbacks of this traditional network architecture 100 which make it unsuitable for many current data centers. Such drawbacks include inconsistent latency (due to different numbers of hops between source and destination servers), limitations on scalability and limitations of the spanning tree protocol (STP). Each of these drawbacks is introduced below.

§ 1.2.1.1 Traffic Flows with Inconsistent Latency

The traditional data center network architecture 100 was developed based on an assumption that most of the traffic in a data center flows in user-server and server-user (commonly referred to as a "north-south") directions. That is, the assumption was that north-south traffic would be greater than server-to-server (commonly referred to as "east-west") traffic Although the foregoing assumption remains valid for some service provider data centers, with new Content Delivery Networks (CDNs), the majority of traffic in large scale data centers is east-west traffic, and this trend from north-south traffic to east-west traffic is expected to continue. Server-to-server (east-west) traffic (e.g., App-Database, App-Web, VM migration, Data Replication) communication in data centers has been increasing significantly.

Referring to FIG. 1, when server A 110a wants to reach server D 110d, inter-vLAN (virtual local area network, or virtual LAN) traffic takes the path to one of the core switches 142 and goes back to server D 110d by passing through all layers 120/130/140. However intra-vLAN traffic can be handled by the distribution layer 130. This means the number of hops, and therefore the latency, of traffic will vary based on the type of communication. In data center networks, the consistency of these two related parameters has become more critical than before, and the classic tree-based architecture such as that of FIG. 1 does not provide such consistency.

§ 1.2.1.2 Scalability Limitations

When the data center grows, the traditional data center network architecture 100 may be unable to scale due to port/card/device/bandwidth limitations. Adding new devices to the distribution layer 130 will result in adding new devices to the core layer 140 at some point, because the core layer 140 has to be adjusted based on the increased bandwidth requirements of the lower layers 130 and/or 120. This means that the data center has to scale vertically, since it was developed based on north-south traffic considerations.

§ 1.2.1.3 Limitations Due to the Spanning Tree Protocol (STP)

STP is designed to prevent loops from being created when there are redundant paths in the network. Vendor-specific alternatives to STP include virtual PortChannel (vPC) from Cisco, QFabric from Juniper Networks, Fabric Path from Cisco, Multi chassis Link Aggregation (MLAG), Virtual Cluster Switching (VCS) from Brocade and Transparent Interconnection of Lots of Links (TRILL) from the IETF. By using a combination of these protocols instead of STP, users can employ most of their L2 links and create a loop-free structure. For example, it is possible to bond switches/links and let them act as one switch/link. "L2 routing" can be enabled on the network as well.

However, even when using these technologies, scalability can still be an issue. It is not possible to bond more than two switches (this is supported only with various limitations). Vendor dependency is another disadvantage, as most of these protocols are vendor proprietary. Finally, these vendor-specific protocols might not operate well with one another.

§ 1.2.2 CLOS Network Architecture for Data Centers

FIG. 2 illustrates the use of a CLOS network topology to interconnect servers 210 in a data center environment 200. The CLOS network includes a spine layer 230 and a leaf layer 220. The servers 210a-210h are connected to leaf nodes (e.g., switches, routers, etc.) 222a-222d (also referred to as Top of Rack nodes, or TOR nodes), and each leaf node 222a-22d is connected to all spine nodes 232a-232d There are no direct leaf-to-leaf, or spine-to-spine connections. The CLOS network topology has a number of advantages.

First, regardless of being in the same VLAN condition, each server is three hops away from any of the other servers in a three-stage CLOS topology. (This topology be expanded to 5-stage CLOS topology by dividing the topology into clusters and adding another top-spine layer (also known as a super-spine layer), in which case each server would be five hops away from any of the other servers.) In any event, no matter how many stages there are, total hop count will be the same between any two servers. Thus, consistent latency can be maintained throughout the data center.

Second, Multi-Chassis Link Aggregation Group (MLAG or MCLAG) is available on the server side. That is, any of the servers 210a-210h can be connected to two (or more) different leaf or TOR nodes 222 in order to have redundancy and/or load balancing capability. On the other hand, as the connectivity matrix is quite complex in this topology, failures can be handled gracefully. For example, even if any three of the four spine nodes 232a-232d were to go down simultaneously, connectivity between each of the servers 210a-210h would remain.

Third, the CLOS topology scales horizontally, which is very cost effective. The bandwidth capacity between servers 210a-201h can be increased by adding more spine-leaf links, as well as adding more spine nodes 232. As newly added spine nodes 232 will be connected to each leaf node 222, server-to-server bandwidth/throughput will increase significantly. This attribute makes CLOS network topologies more cost effective than the traditional data center network topology because spine nodes do not have to be big and expensive (as opposed to the core nodes 142 in FIG. 1, which do have to be big and expensive) when scaling in the traditional design. If there are so many TOR/leaf nodes 222 that users hit some kind of port limitation, then spine nodes 232 with a high number of ports could be used in the spine layer 230. Alternatively, a 5-stage, 7-stage, or a multiple pod architecture could be used.

§ 1.2.2.1 L2 Switching Versus L3 Routing in a CLOS Network

When compared to L2 switching, layer 3 (L3) routing has many benefits, not only for scalability and resiliency, but also for visibility (which is quite important to the planning and operation teams).

FIG. 3 illustrates an example environment 300 using a CLOS network topology in which TOR nodes 315 are separated from the leaf layer 320, and in which the spine layer 330 to leaf layer 320 connections are L3 connections (indicated by solid lines). In this example environment 300, TOR instances $315_{L2}$ are connected to leaf instances $320_{L2}$ with L2 links (indicated by dashed lines) MLAG enables operators to utilize all the links and create bandwidth aggregation to leaf nodes.

However, the environment 300 has some disadvantages. For example, in general, the size of L2 domains should be limited due to the difficulty in troubleshooting L2 environments. There is also the risk of broadcast storms in large L2 domains, and MLAG is vendor dependent. This introduces limitations such as being able to use only two leaves in one instance.

FIG. 4 illustrates an example environment 400 in which L3 routing is deployed all the way down to the TOR nodes 315. The L3 connections are indicated by solid lines.

§ 1.2.2.3 Choice of L3 Routing Protocol in a CLOS Network

For reasons set forth in RFC 7938, the exterior Border Gateway Protocol (eBGP) (See, e.g., RFC 4271 and its extensions from the IETF, each of which is incorporated herein by reference) is often used as the L3 routing protocol in CLOS topology networks in data centers. For example, BGP is better than interior gateway protocols (IGPs) (such as OSPF and IS-IS) when dealing with a high number of prefixes, and it has a limited event propagation scope. In such a complex connectivity matrix (where complexity depends, in part, on the number of nodes), IGP will propagate link state changes throughout the network, even to the irrelevant nodes which are not impacted. Even if IGP were to be used. BGP would still likely remain in the data center, most likely at the edge. This means that IGP were used, there would be two routing protocols running.

With its attributes and filters, BGP provides much better flexibility on controlling the traffic, and it provides per-hop traffic engineering capability than IGP. BGP autonomous system (AS) path visibility also helps operators troubleshoot problems more easily than with IGP. Further, BGP can be extended across data centers and used as a control plane protocol (e.g., EVPN) for VXLAN overlays. This provides many benefits such as active/active multi-homing. By default, IGP is more compatible with equal cost multipath routing (ECMP), where BGP configuration should be adjusted to meet the load balancing requirements.

As to whether to use interior BGP (iBGP) or eBGP, route reflection between nodes can cause problems if iBGP is used More specifically, spine switches can be declared as route reflectors, but can be problematic if ECMP paths are desired since route reflectors reflect only the best paths. The BGP add-path feature has to be enabled to push all routes to the leaves. On the other hand, "AS_Path Multipath Relax (Multi-AS Pathing)" needs to be enabled in eBGP. However, eBGP does not require maintaining route reflectors in data centers.

BGP has extensive capabilities on per-hop traffic engineering With iBGP, it is possible to use some part of this capability but eBGP's attributes provide better visibility, such as directly comparing BGP-Local-RIB to Adj-RIB-In and Adj-RIB-Out. In terms of traffic engineering and troubleshooting, eBGP it is better than iBGP.

§ 1.2.2.4 CLOS with EBGP Design

Referring to FIG. 4, in which eBGP is used between each tier of the example CLOS network 400, all of the spine nodes (e.g., routers, switches, etc.) 332a-332d share one common AS number. Each leaf instance (pod) $320_1$' and $320_2$' and each TOR node (e.g., router, switch, etc.) 315a1'-315b2' has its own AS number. This avoids path hunting issues in BGP.

The example topology 400 of FIG. 4 is multiple pod/instance design. Such a design reduces the number of links between the leaf layer 320' and the spine layer 330. It also allows operators to put more than one leaf node in each AS This type of arrangement is common, especially in large data center networks Consider the possible paths from server A 310a to server H 310h. There are four different paths, and each of them has the same AS_Path attribute (since each goes through node 315a1', leaf instance 1 $320_1$', spine 330, leaf instance 2 $320_2$' and node 315b2') If the other attributes are also the same, BGP can utilize all ECMP paths by enabling multi-path functionality. However, this would be more challenging if each leaf node 320a1'-320b2' has its own AS number, and/or if servers are connected to more than one TOR node for redundancy. More specifically, in such possible topologies, although the length of each AS Path attribute would be the same, this does not suffice for using multi-paths in BGP because in order for BGP to route traffic over multiple paths, all attributes have to be the same, including the content of the AS Path attribute. In order to meet this requirement, the "AS Path multi-path relax" feature needs to be enabled to let BGP ignore the content of the AS Path attribute, while installing multiple best routes (as long as the length is identical).

There are 1,023 private AS numbers (ASNs) (64112-65535) available. If this is not enough (e.g., due to a large number of TOR switches in a large data center), one option is to use 4-byte ASNs, which enables millions of ASNs. Further, TOR ASNs can be used more than once. In this case, the BGP Allow-AS-In feature needs to be enabled on TOR switches, which will turn off one of BGP's main loop avoidance mechanisms, and TOR switches will accept the routes even though they see their own ASN in received updates. Furthermore, as noted above with reference to FIG. 4, an ASN may be used by multiple leaf nodes in an instance/pod. To avoid the potential for black holes created by such summarization when a specific prefix is withdrawn on the TOR side, specific prefixes should not be hidden.

§ 1.2.2.4.1 the Potential for Routing "Micro-Loops" in a CLOS Network with EBGP Design Section 7.5 of RFC 7938 discusses the potential problem of routing micro-loops in a CLOS topology network running eBGP. More specifically, when a downstream device, (e.g., a Tier 2 device such as a leaf node $320a1'$-$320b2'$, loses all paths for a given prefix, it normally has the default route pointing toward an upstream device (e.g., a Tier 1 device such as a spine node $332a$-$332d$). Consequently, if a Tier 2 node 320 loses a prefix, but a Tier 1 node 330 still has the path pointing to the Tier 2 node 320, a transient micro-loop becomes possible, since the Tier 1 node 330 will keep passing packets with the affected prefix back to the Tier 2 node 320, and the Tier 2 node 320 will bounce such packets back again using the default route to the upstream Tier 1 node 330. This micro-loop might last for the time it takes the upstream device to fully update its forwarding tables (or for the time it takes ECMP to select another route).

To reduce the impact of such micro-loops, RFC 7938 proposes configuring Tier 2 nodes 320 and Tier 1 nodes 330 with static "discard" or "null" routes that will be more specific than the default route for prefixes missing during network convergence. For Tier 2 nodes 320, RFC 7938 notes that the discard route should be a summary route, covering all server subnets of the underlying Tier 3 nodes (e.g., TOR nodes) 310. For Tier 1 nodes 330, RFC 7938 notes that the discard route should be a summary covering the server IP address subnets allocated for the whole data center. Those discard routes will only take precedence for the duration of network convergence, until the node learns a more specific prefix via a new path.

Thus, the solution to routing micro-loops proposed in RFC 7928 discards packets rather than having them loop. This can be considered a "lesser of two evils" approach. Clearly, it would be useful if routing micro-loops could be avoided in a better way (e.g., in a way that avoids discarding or otherwise dropping packets).

§ 2. SUMMARY OF THE INVENTION

The problem of routing micro-loops in networks having a CLOS topology, such as data center CLOS networks (e.g., in which nodes of the network are arranged in at least three (3) tiers) employing the exterior border gateway protocol (eBGP) for example, may be solved by: (a) receiving, on an interface of one of the nodes, a datagram, the datagram including destination information; (b) determining a next hop and an egress interface using (1) an identifier of the interface on which the datagram was received, (2) the destination information of the received datagram, and (3) stored forwarding information such that a routing micro-loop is avoided without discarding the datagram; and (c) forwarding the datagram via the egress interface.

In some example implementations consistent with the present disclosure, the act of determining a next hop and an egress interface includes performing a single lookup using the destination information and the interface on which the datagram was received to select the egress interface and a next hop.

In some other example implementations consistent with the present disclosure, the problem of routing micro-loops in networks having a CLOS topology, such as data center CLOS networks (e.g., in which nodes of the network are arranged in at least three (3) tiers) employing the exterior border gateway protocol (eBGP) for example, may be solved by: (a) receiving, on an interface of a node of the CLOS network, a datagram, the datagram including destination information; (b) looking up, using the destination information of the received datagram and stored forwarding information, a next hop egress interface on the node; (c) determining whether or not the next hop egress interface on the node is the same as the interface on which the datagram was received; and (d) responsive to a determination that the next hop egress interface on the node is the same as the interface on which the datagram was received, (1) replacing the next hop egress interface with a safe multipath next hop egress interface, and (2) forwarding the datagram via the safe multipath next hop egress interface, and otherwise, responsive to a determination that the next hop egress interface on the node is not the same at the interface on which the datagram was received, simply forwarding the datagram via the next hop egress interface.

§ 3. BRIEF DESCRIPTION OF THE DRAWINGS

FIGS. 7A-7D illustrate pertinent parts of various forwarding tables used by various nodes in the example CLOS network topology of FIG. 6.

FIGS. 11A and 11B illustrate example packet forwarding operations of the example distributed ASICs of FIG. 10.

§ 4. DETAILED DESCRIPTION

The present disclosure may involve novel methods, apparatus, message formats, and/or data structures for reducing or eliminating routing micro-loops in networks having a CLOS topology, such as data center CLOS networks employing the exterior border gateway protocol (eBGP) for example. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventor regards his invention as any patentable subject matter described.

§ 4.1 Definitions

The following terms may be used in this disclosure.

"BGP speaker": A router that implements BGP.

"Exterior BGP (or eBGP)": A BGP connection between external peers (that is, peers within different ASes).

Forwarding Information Base (or "FIB"): A data structure used to forward a received (ingress) packet towards its destination by determining a next hop.

"Interior BGP (or iBGP)": A BGP connection between internal peers (that is, peers within the same AS).

"Interior Gateway Protocol (or "IGP")": A routing protocol used to exchange routing information among routers within a single Autonomous System (AS).

"Next Hop": A next node (e.g., switch or router) to which a packet is sent from any given router as it traverses a network on its way to its final destination.

"Prefix": part of an address that defines part of a communications network (e.g., a subnetwork), such as an Internet Protocol ("IP") network for example.

"Route": A unit of information that pairs a set of destinations with the attributes of a path to those destinations. The set of destinations are systems whose IP addresses are contained in one IP address prefix.

"RIB": Routing Information Base.

§ 4.2 Example Methods

Figure 1:
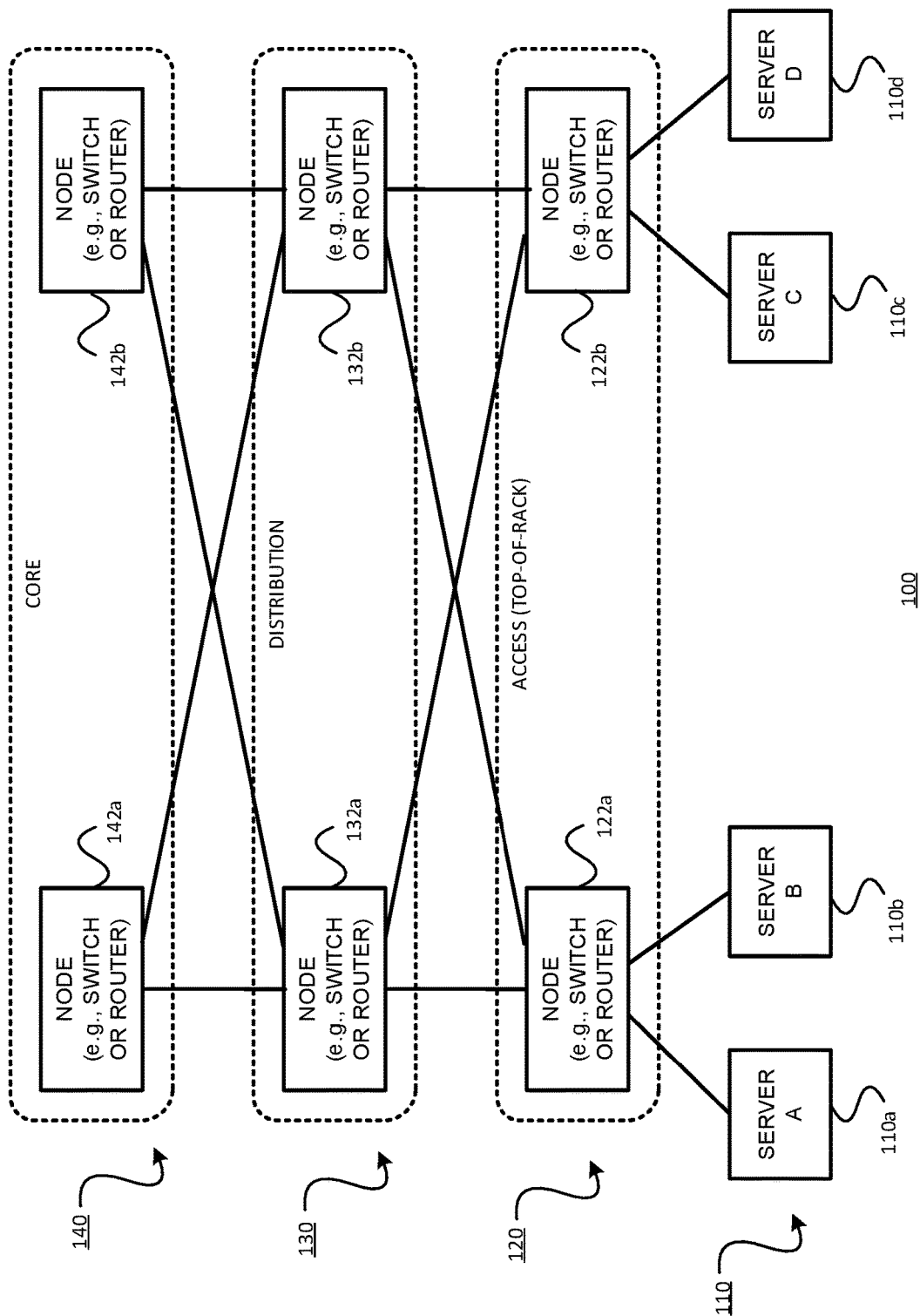
FIG. 1 illustrates a conventional data center network topology.
Figure 2:
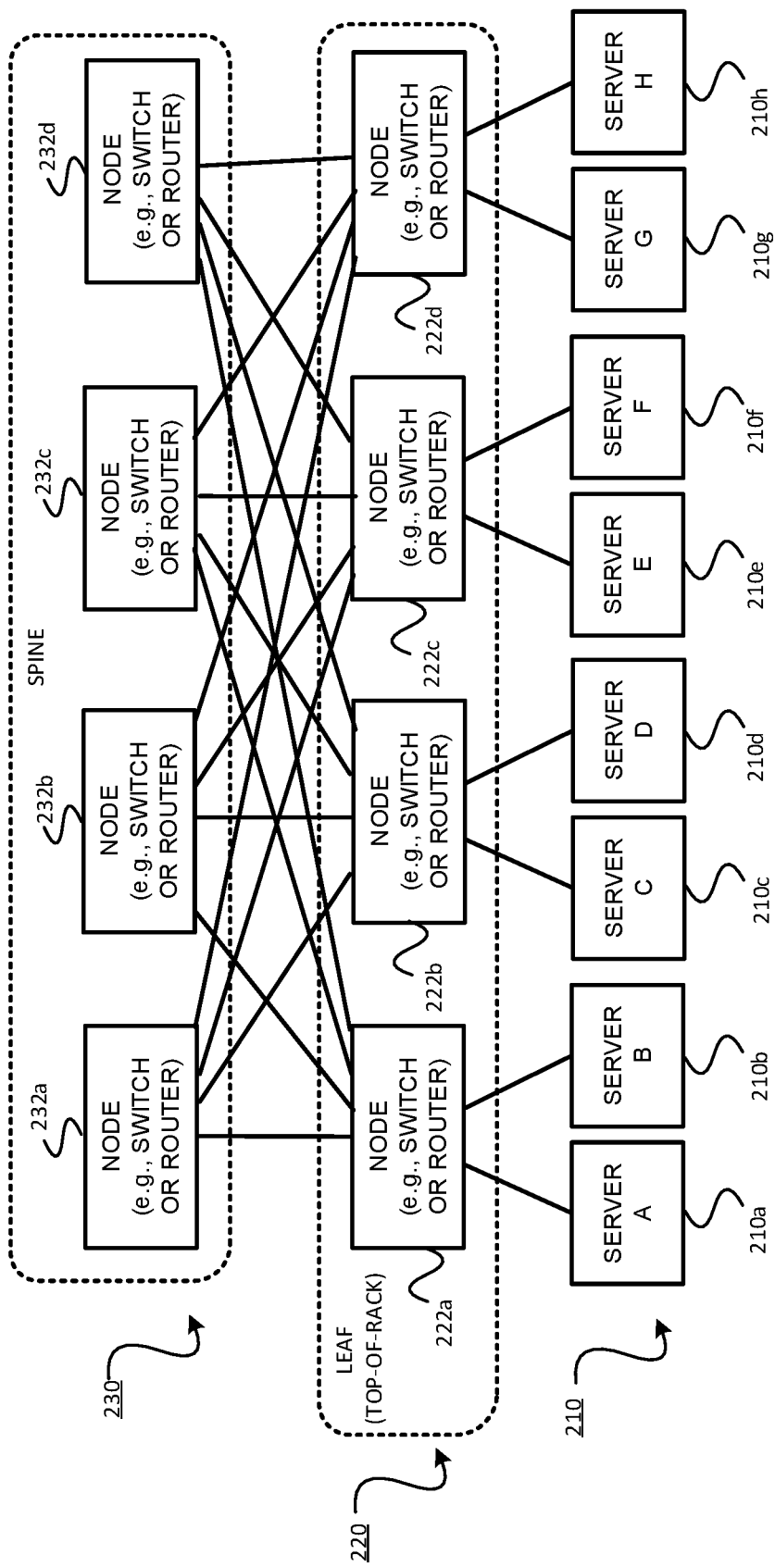
FIG. 2 illustrates a CLOS network topology interconnecting servers in a data center environment.
Figure 3:
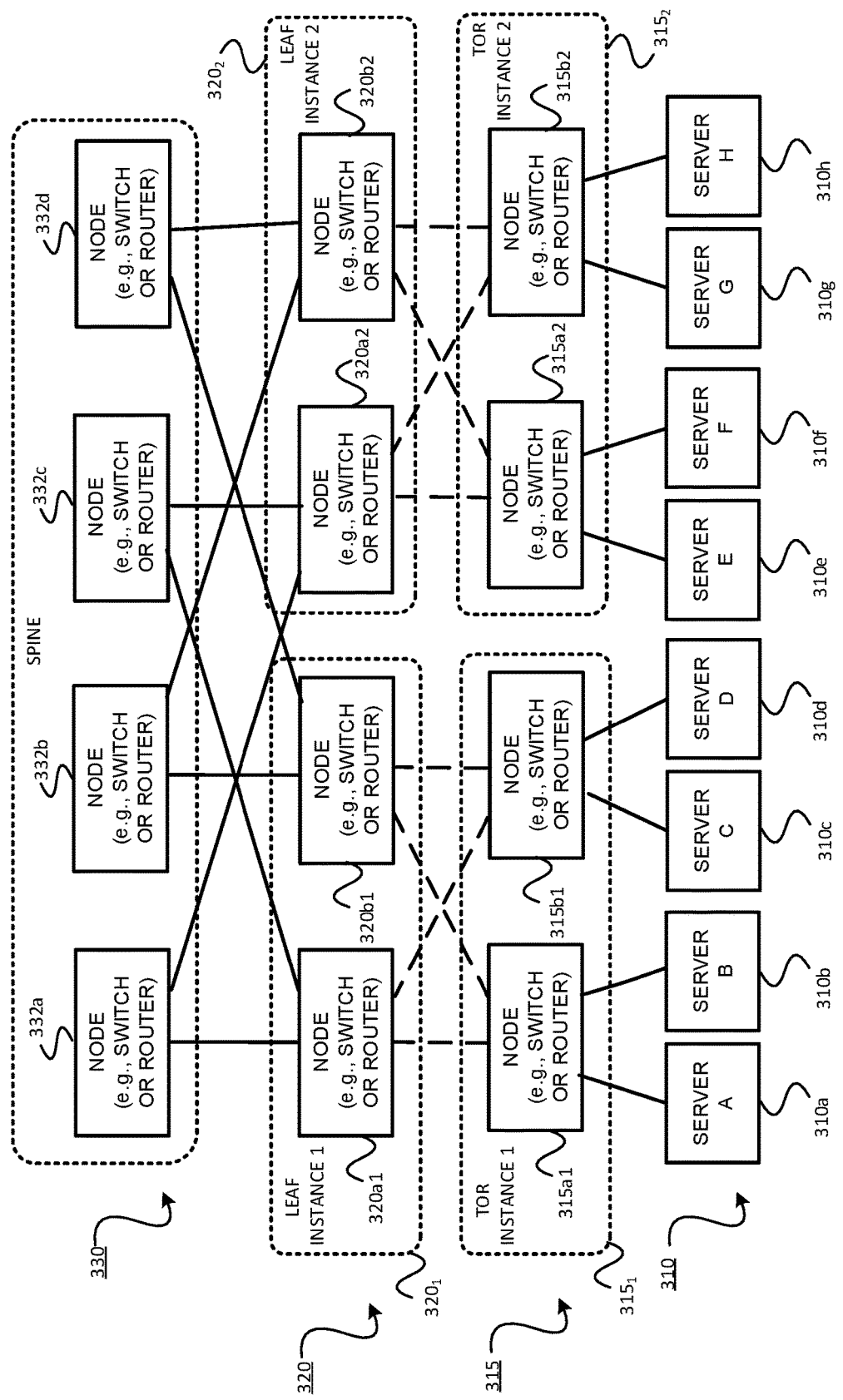
FIG. 3 illustrates a CLOS network topology, using both L2 and L3 links, interconnecting servers in a data center environment.
Figure 4:
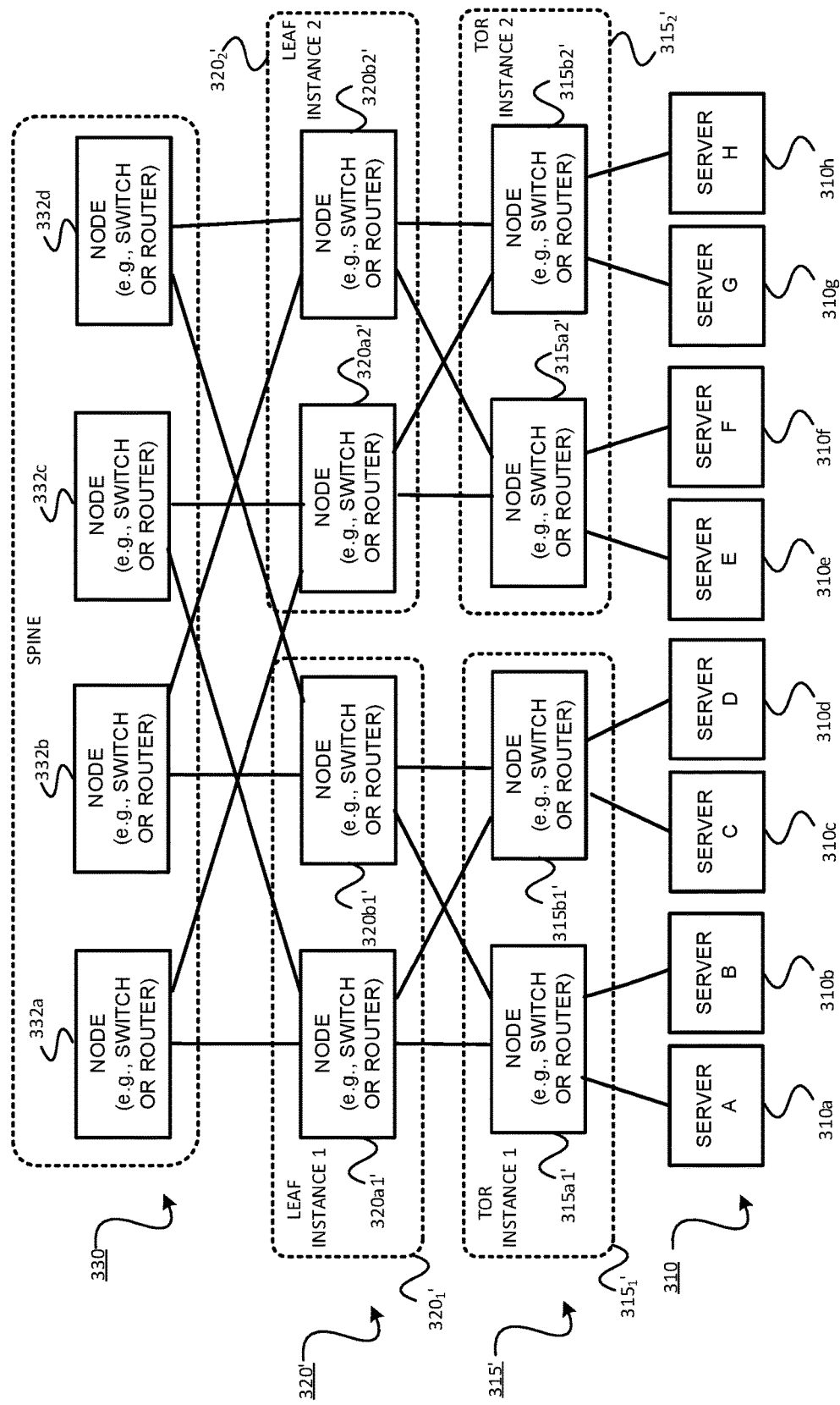
FIG. 4 illustrates a CLOS network topology, using L3 links throughout, interconnecting servers in a data center environment.
Figure 5A:
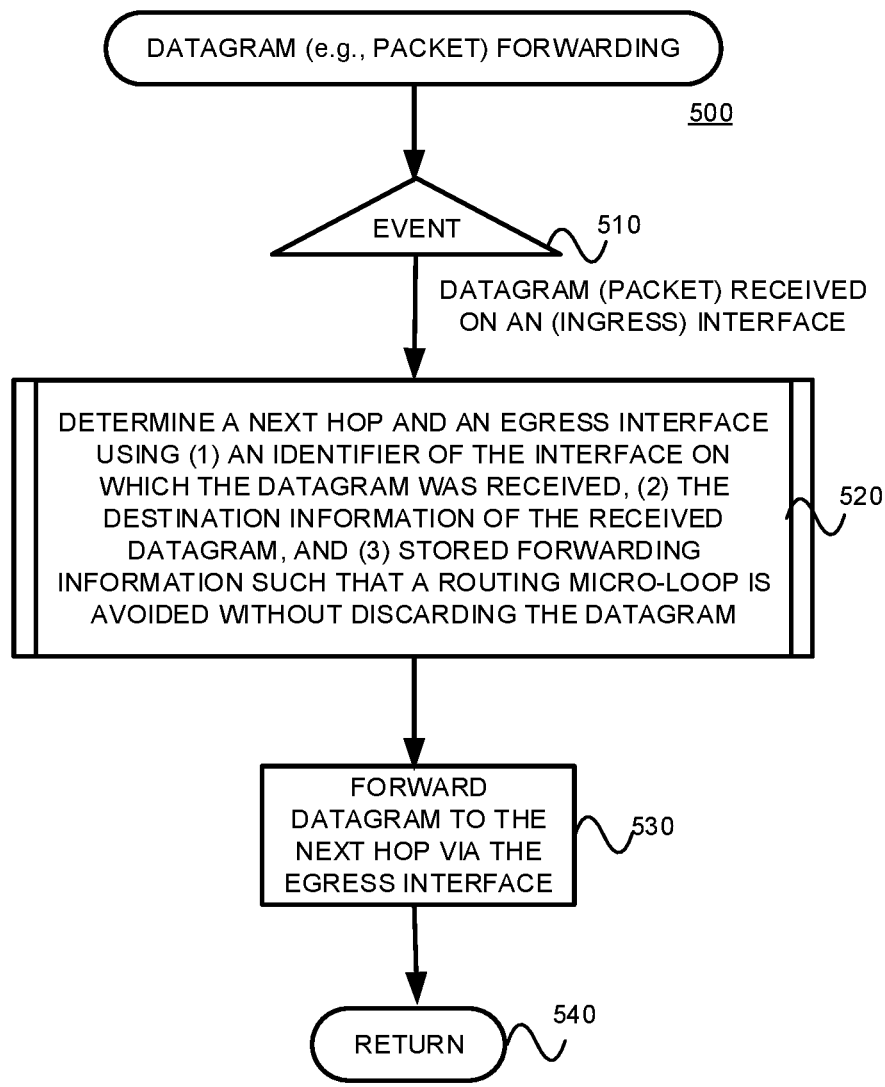
FIGS. 5A and 5B are flow diagrams of example methods for forwarding datagrams in a CLOS network, in a manner consistent with the present description, in order to avoid micro-loops.

FIG. 5A is a flow diagram of an example method for reducing or eliminating routing micro-loops in a network having a CLOS topology. The nodes of the network are arranged in at least three (3) tiers. The example method 500 may be performed by a node (e.g., a switch or a router) in the network. As indicated by event trigger 510, the main steps of the example method 500 are performed when a datagram (e.g., a packet) is received on an interface of the node. The datagram includes destination information. The destination information may be a layer 3 destination address, such as an Internet Protocol (IP) address of one of the servers in a data center for example.

In response to receiving the datagram, the example method 500 determines a next hop and an egress interface using (1) an identifier of the interface on which the datagram was received, (2) the destination information of the received datagram, and (3) stored forwarding information such that a routing micro-loop is avoided without discarding the datagram. (Block 520) That is, the example method 500 determines a next hop and an egress interface such that the egress interface is not the same as the interface on which the datagram was received. The method 500 then forwards the datagram via the egress interface (Block 530) before the method 500 is left (Node 540).

Figure 5B:
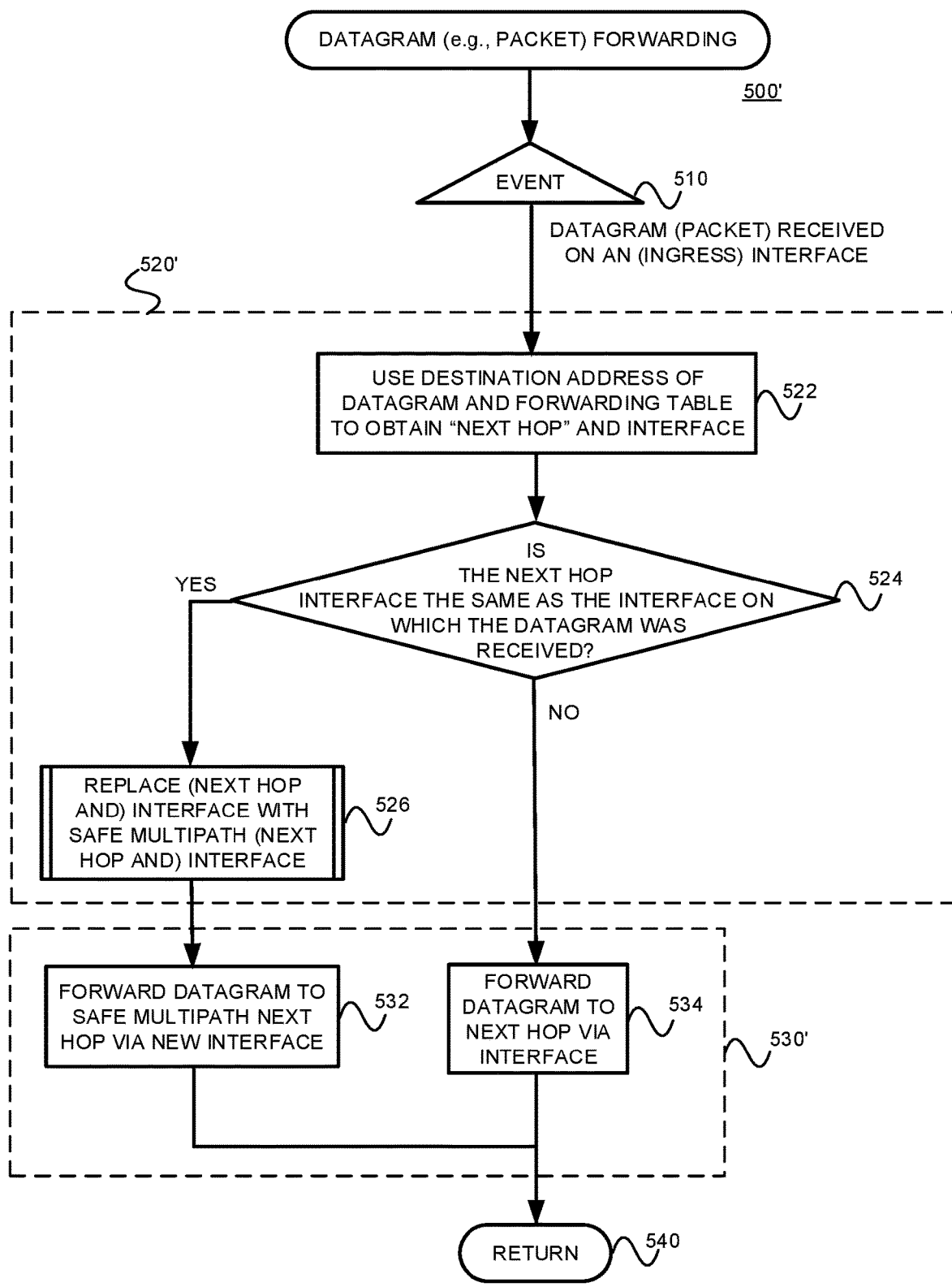

FIG. 5B is a flow diagram of another example method 500' (which is consistent with the method 500 of FIG. 5A) for reducing or eliminating micro-loops in a network having a CLOS topology, in a manner consistent with the present disclosure. The nodes of the network are arranged in at least three (3) tiers. The example method 500' may be performed by a node (e.g., a switch or a router) in the network. As indicated by event trigger 510, the main steps of the example method 500' are performed when a datagram (e.g., a packet) is received on an interface of the node. The datagram includes destination information. The destination information may be a layer 3 destination address, such as an Internet Protocol (IP) address of one of the servers in a data center for example.

In response to receiving the datagram, the example method 500' looks up, using the destination information of the received datagram and stored forwarding information, a next hop egress interface on the node. (Block 522) Note that the stored forwarding information may include, for example, a plurality of entries, each including a destination address prefix, a next hop node, a next hop egress interface and one or more safe multipath next hop interfaces.

The example method 500' then determines whether or not the next hop egress interface on the node is the same as the interface on which the datagram was received. (Decision 524) Responsive to a determination that the next hop egress interface on the node is the same as the interface on which the datagram was received (Decision 524, YES), the example method 500' (1) replaces the next hop egress interface with a safe multipath next hop egress interface (Block 526), and (2) forwards the datagram via the safe multipath next hop egress interface (Block 532), before the example method 500' is left (Node 540). Otherwise, responsive to a determination that the next hop egress interface on the node is not the same at the interface on which the datagram was received (Decision 524, NO), the example method 500' forwards the datagram via the next hop egress interface (Block 534) before the example method 500' is left (Node 540).

In some example methods, the destination information is a layer-3 destination address. For example, the destination address may be a layer-3 destination address (e.g., Internet Protocol version 4 (IPv4), or Internet Protocol version 6 (IPv6) address) of a server linked with at least one top-of-rack node of the network.

In some example methods, the loops are routing micro-loops between nodes of adjacent tiers in the CLOS network.

In some example methods, the nodes of the network run a border gateway protocol (BGP), such as an exterior border gateway protocol (eBGP) for example.

In some example methods, the node executing the method is located in a tier other than the third tier, such as in a tier other than the top-of-rack tier for example.

In some example methods, the act of replacing the next hop egress interface with a safe multipath next hop egress interface includes selecting one of a plurality of safe next hop interfaces in such a manner that the plurality of safe next hop interfaces are selected with an even distribution. In some example methods, the act of replacing the next hop egress interface with a safe multipath next hop egress interface includes selecting one of a plurality of safe next hop interfaces in a round-robin manner in some other example methods, the act of replacing the next hop egress interface with a safe multipath next hop egress interface includes selecting one of a plurality of safe next hop interfaces randomly In some example methods, each of the plurality of safe next hop interfaces is stored on the node in association with a prefix matching the destination information.

§ 4.2.1 Example of Operations of Example Method

Figure 6:
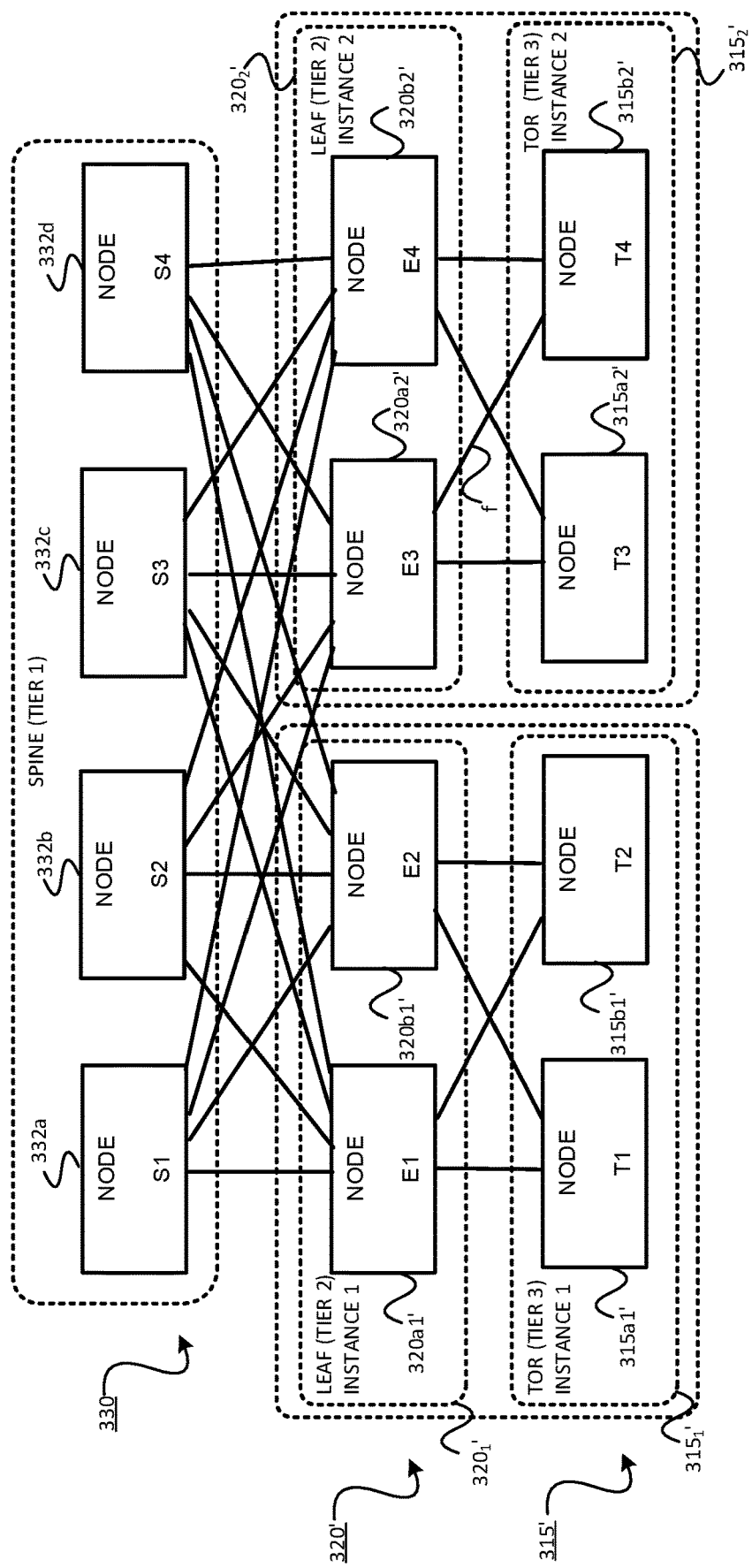
FIG. 6 is an example CLOS network topology used to illustrate example operations in an example method consistent with the present description.

A simple example serving to illustrate operations of the example method 500' is now described with reference to FIGS. 6 and 7A-7D. FIG. 6 illustrates an example network 600 having a CLOS topology. The network 600 includes a TOR (or Tier 3) level 315', a leaf (or Tier 2) level 320' and a spine (or Tier 1) level 330. The TOR level 315' includes nodes T1 315a1', T2 315b1', T3 315a2' and T4 315b2'. The leaf level 320' includes nodes E1 320a1', E2 320b1', E3 320a2' and E4 320b2'. The spine level 330 includes nodes S1 332a, S2 332b, S3 332c and S4 332d. Nodes T1, T2, E1 and E2 are arranged in a first instance (or pod, or cluster), and nodes T3, T4, E3 and E4 are arranged in a second instance (or pod, or cluster). As shown, TOR nodes are only linked with leaf nodes in the same instance (or pod, or cluster). That is, each of T1 and T2 is linked with both E1 and E2, but not with E3 and E4. Similarly, each of T3 and T4 is linked with both E3 and E4, but not with E1 and E2. Each of the leaf nodes E1-E4 is linked with every one of the spine nodes S1-S4. Servers connected with each other via the network 600 are not shown. However, each such server may be coupled with one (and feasibly more) of the TOR nodes 315a1', 315b1', 315a2', 315b2'.

Consider routing for a datagram (e.g., a packet) destined for a server linked to TOR node T4. Referring to both FIGS. 6 and 7A, leaf node E3 has only a single next hop to T4. (Note that one of next hops S1*-S4* may be used in the event that the link between E3 and T4 is down.) Similarly, leaf node E4 has only a single next hop to T4.

Referring to both FIGS. 6 and 7B, leaf node E1 has four alternative next hops to T4 (e.g., via any one of spine nodes S1-S4). Next hop S1 is associated with at least one safe multipath next hop S2, S3, S4, next hop S2 is associated with a least one safe multipath next hop S1, S3, S4, next hop S3 is associated with at least one safe multipath next hop S1, S2, S4, and next hop S4 is associated with at least one safe multipath next hop S1, S2, S3. Leaf node E2 will have the same next hops (and the same safe multipath next hops) to T4.

Referring to both FIGS. 6 and 7C, TOR node T1 will have two alternative next hops to T4 (e.g., via leaf node E1 or via leaf node E2). Further, next hop E1 is associated with safe multipath next hop E2, and next hop E2 is associated with safe multipath next hop E1. TOR node T2 will have the same next hops (and the same safe multipath next hops) to T4.

Finally, referring to both FIGS. 6 and 7D, the spine node S1 will have two alternative next hops to T4 (e.g., via leaf node E3 or via leaf node E4). Further, next hop E3 is associated with safe multipath next hop E4, and next hop E4 is associated with safe multipath next hop E3. Each of the spine nodes S2-S4 will have the same next hops (and the same safe multipath next hops) to T4. (Note that one of next hops E1* and E2* may be used in the event that both of the links between S1 and E3, and S1 and E4 are down. However, such double-link failures are not addressed with safe multipath next hop(s).)

Next, handling failures with fast reroute (FRR) using multipath, assuming T4 is the destination, is illustrated with reference to FIGS. 5, 6, and 7A-7D.

Consider first a failure in the link between T1 and E1. Referring to FIG. 7C, in such a case, the next hop to E1 is excluded and a datagram destined for T4 will be forwarded via E2.

Now consider a failure in the link between E1 and S1. Referring to FIG. 7B, in such a case, the next hop to S1 will be excluded and the datagram destined for T4 will be forwarded via any one of S2-S4. When there are multiple next hops available, one may be selected using a scheme such as random selection, round robin selection, etc. A selection scheme with an even distribution (i.e., in which available next hops are equally likely to be selected) may be used.

Next, consider a failure in the link between S1 and E4. Referring to FIG. 7D, in such a case, the next hop to E4 will be excluded and the datagram destined for T4 will be forwarded via E3.

Finally, consider a failure in the link between E3 and T4. Referring to FIG. 7A, in this case, there is no alternative path for a datagram designed to T4, unless the datagram goes back up to one of the spine nodes S1-S4. More specifically, under BGP, nodes E4 and S1-S4 may have already announced (e.g., via a BGP Update advertisement(s)) to node E3 that node T4 is reachable by them. However, such multipaths are normally not formed via any one of S1-S4 due to the AS path (i.e., the number of different AS domains that need to be traversed) being longer than the direct path from node E3 to node T4. Example implementations consistent with the present description permit node E3 to install an alternative path, via any one of spine nodes S1-S4, for datagrams destined for T4. The alternative path next hops are denoted by an asterisk. This will enable E3 to perform fast reroute repair.

Consider, however, the potential problem of a routing micro-loop in this example. More specifically, if the link "f" between nodes E3 and T4 is down, node E3 may send a datagram destined for T4 back up to any one of the spine nodes S1-S4. However, it is possible that the receiving spine node S1, S2, S3, or S4 will send the datagram right back to node E3, causing a routing micro-loop. Applying the example method 500' of FIG. 5B, if the spine node S1, S2, S3, or S4 receiving the datagram determines the next hop to be node E3, since the next hop interface will be the same as the interface on which the datagram was received (Recall, e.g., 524 (YES) of FIG. 5B), the spine node will replace the next hop interface (to node E3) with a safe multipath next hop interface (e.g., to node E4). (See, e.g., FIG. 7D.) Node E4 can then forward the packet to node T4, thereby bypassing the failed link f and avoiding a micro-loop.

As can be appreciated by this simple example, example methods consistent with the present description can be used to avoid micro-loops in a CLOS network, such as a CLOS network used in a data center.

§ 4.3 Example Apparatus

Figure 8:
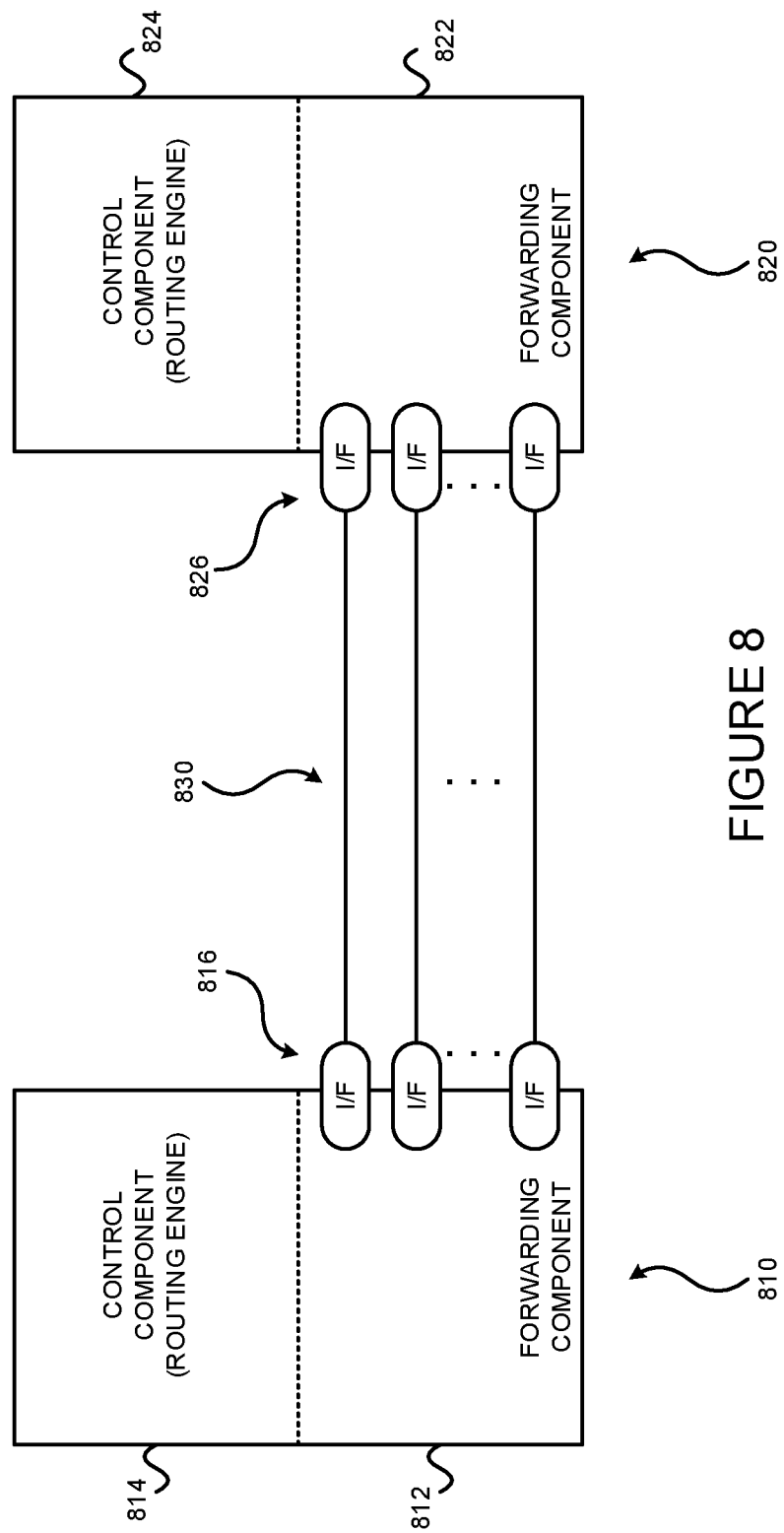
FIG. 8 illustrates an example environment including two systems coupled via communications links.

FIG. 8 illustrates two data forwarding systems 810 and 820 coupled via communications links 830. The links may be physical links or "wireless" links. The data forwarding systems 810,820 may be nodes, such as routers for example, in a CLOS network. If the data forwarding systems 810,820 are example routers, each may include a control component (e.g., a routing engine) 814,824 and a forwarding component 812,822. Each data forwarding system 810,820 includes one or more interfaces 816,826 that terminate one or more communications links 830. Assuming the device 810 a node at one layer of a CLOS network and the device 820 is a node at another, adjacent, layer of the CLOS network, the example method 500 described above may be implemented in the forwarding component 822 of device 820. Although the example method 500 described above may also be implemented, in part, by having the control component 824 of device 820 predetermine the safe next hop, the forwarding component 822 can identify the safe next hop interfaces without such predetermination by the control component 824.

As just discussed above, and referring to FIG. 9, some example routers 900 include a control component (e.g., routing engine) 910 and a packet forwarding component (e.g., a packet forwarding engine) 990.

The control component 910 may include an operating system (OS) kernel 920, routing protocol process(es) 930, label-based forwarding protocol process(es) 940, interface process(es) 950, user interface (e.g., command line interface) process(es) 960, and chassis process(es) 970, and may store routing table(s) 939, label forwarding information 945, and forwarding (e.g., route-based and/or label-based) table(s) 980. As shown, the routing protocol process(es) 930 may support routing protocols such as the routing information protocol ("RIP") 931, the intermediate system-to-intermediate system protocol ("IS-IS") 932, the open shortest path first protocol ("OSPF") 933, the enhanced interior gateway routing protocol ("EIGRP") 934 and the border gateway protocol ("BGP") 935, and the label-based forwarding protocol process(es) 940 may support protocols such as BGP 935, the label distribution protocol ("LDP") 936 and the resource reservation protocol ("RSVP") 937. One or more components (not shown) may permit a user 965 to interact with the user interface process(es) 960. Similarly, one or more components (not shown) may permit an outside device to interact with one or more of the router protocol process(es) 930, the label-based forwarding protocol process(es) 940, the interface process(es) 950, and the chassis process(es) 970, via SNMP 985, and such processes may send information to an outside device via SNMP 985.

The packet forwarding component 990 may include a microkernel 992, interface process(es) 993, distributed ASICs 994, chassis process(es) 995 and forwarding (e.g., route-based and/or label-based) table(s) 996.

Figure 9:
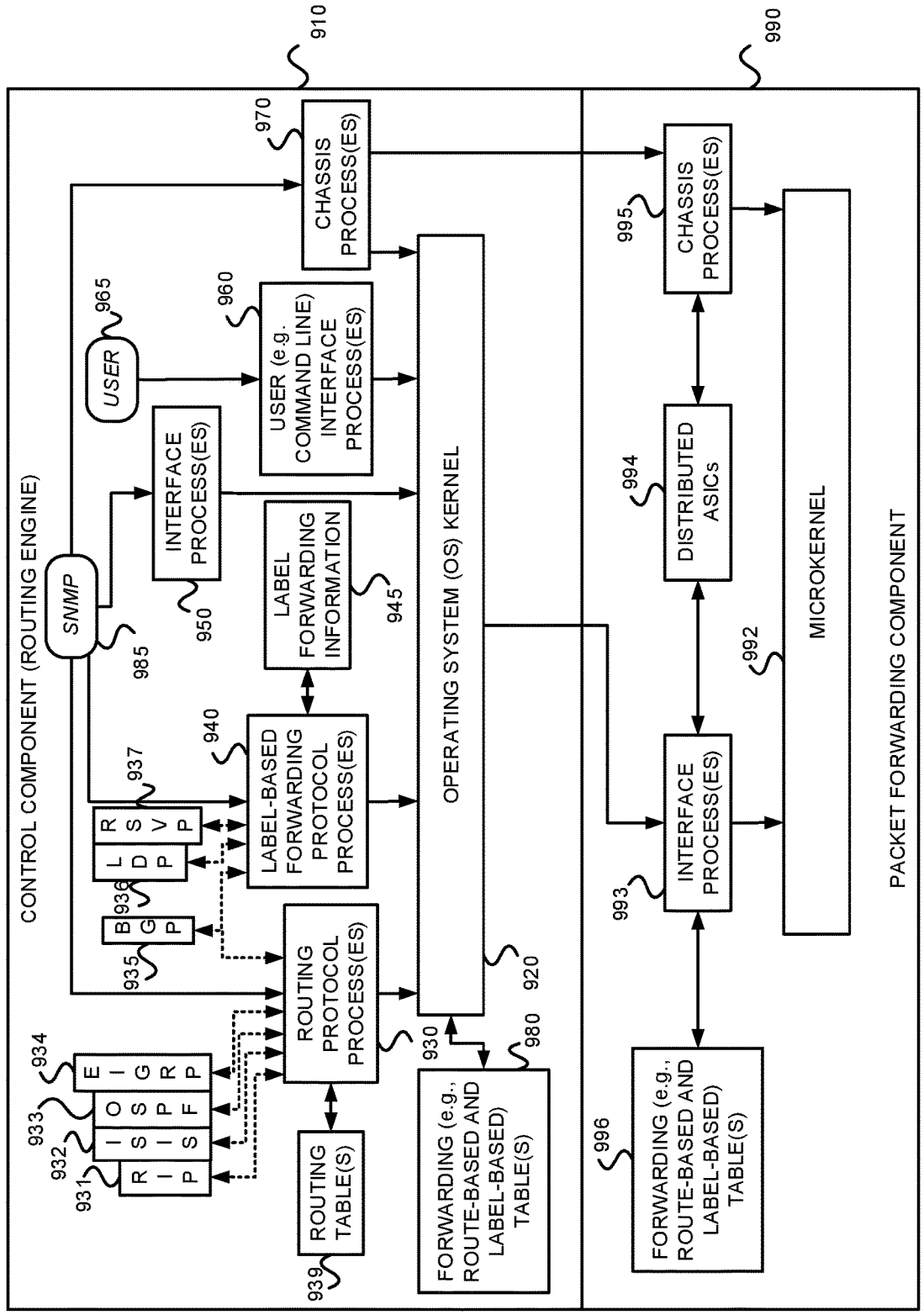
FIG. 9 is a block diagram of an example router on which the example methods of the present description may be implemented.

In the example router 900 of FIG. 9, the control component 910 handles tasks such as performing routing protocols, performing label-based forwarding protocols, control packet processing, etc., which frees the packet forwarding component 990 to forward received packets quickly. That is, received control packets (e.g., routing protocol packets and/or label-based forwarding protocol packets) are not fully processed on the packet forwarding component 990 itself, but are passed to the control component 910, thereby reducing the amount of work that the packet forwarding component 990 has to do and freeing it to process packets to be forwarded efficiently. Thus, the control component 910 is primarily responsible for running routing protocols and/or label-based forwarding protocols, maintaining the routing tables and/or label forwarding information, sending forwarding table updates to the packet forwarding component 990, and performing system management. The example control component 910 may handle routing protocol packets, provide a management interface, provide configuration management, perform accounting, and provide alarms. The processes 930, 940, 950, 960 and 970 may be modular, and may interact with the OS kernel 920. That is, nearly all of the processes communicate directly with the OS kernel 920. Using modular software that cleanly separates processes from each other isolates problems of a given process so that such problems do not impact other processes that may be running. Additionally, using modular software facilitates easier scaling.

Still referring to FIG. 9, the example OS kernel 920 may incorporate an application programming interface ("API") system for external program calls and scripting capabilities. The control component 910 may be based on an Intel PCI platform running the OS from flash memory, with an alternate copy stored on the router's hard disk. The OS kernel 920 is layered on the Intel PCI platform and establishes communication between the Intel PCI platform and processes of the control component 910. The OS kernel 920 also ensures that the forwarding tables 996 in use by the packet forwarding component 990 are in sync with those 980 in the control component 910. Thus, in addition to providing the underlying infrastructure to control component 910 software processes, the OS kernel 920 also provides a link between the control component 910 and the packet forwarding component 990.

Referring to the routing protocol process(es) 930 of FIG. 9, this process(es) 930 provides routing and routing control functions within the platform. In this example, the RIP 931, ISIS 932, OSPF 933 and EIGRP 934 (and BGP 935) protocols are provided. Naturally, other routing protocols may be provided in addition, or alternatively. Similarly, the label-based forwarding protocol process(es) 940 provides label forwarding and label control functions. In this example, the LDP 936 and RSVP 937 (and BGP 935) protocols are provided. Naturally, other label-based forwarding protocols (e.g., MPLS) may be provided in addition, or alternatively. In the example router 900, the routing table(s) 939 is produced by the routing protocol process(es) 930, while the label forwarding information 945 is produced by the label-based forwarding protocol process(es) 940.

Still referring to FIG. 9, the interface process(es) 950 performs configuration of the physical interfaces (Recall, e.g., 816 and 826 of FIG. 8) and encapsulation.

The example control component 910 may provide several ways to manage the router. For example, it 910 may provide a user interface process(es) 960 which allows a system operator 965 to interact with the system through configuration, modifications, and monitoring. The SNMP 985 allows SNMP-capable systems to communicate with the router platform. This also allows the platform to provide necessary SNMP information to external agents. For example, the SNMP 985 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 910, thereby avoiding slowing traffic forwarding by the packet forwarding component 990.

Although not shown, the example router 900 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 960 via a console port, an auxiliary port, and/or a management Ethernet port The packet forwarding component 990 is responsible for properly outputting received packets as quickly as possible.

If there is no entry in the forwarding table for a given destination or a given label and the packet forwarding component 990 cannot perform forwarding by itself, it 990 may send the packets bound for that unknown destination off to the control component 910 for processing. The example packet forwarding component 990 is designed to perform Layer 2 and Layer 3 switching, route lookups, and rapid packet forwarding.

As shown in FIG. 9, the example packet forwarding component 990 has an embedded microkernel 992, interface process(es) 993, distributed ASICs 994, and chassis process(es) 995, and stores a forwarding (e.g., route-based and/or label-based) table(s) 996. (Recall, e.g., the tables in FIGS. 7A-7D.) The microkernel 992 interacts with the interface process(es) 993 and the chassis process(es) 995 to monitor and control these functions. The interface process(es) 992 has direct communication with the OS kernel 920 of the control component 910. This communication includes forwarding exception packets and control packets to the control component 910, receiving packets to be forwarded, receiving forwarding table updates, providing information about the health of the packet forwarding component 990 to the control component 910, and permitting configuration of the interfaces from the user interface (e.g., CLI) process(es) 960 of the control component 910. The stored forwarding table(s) 996 is static until a new one is received from the control component 910. The interface process(es) 993 uses the forwarding table(s) 996 to look up next-hop information. The interface process(es) 993 also has direct communication with the distributed ASICs 994. Finally, the chassis process(es) 995 may communicate directly with the microkernel 992 and with the distributed ASICs 994.

In the example router 900, the example method 500 consistent with the present disclosure may be implemented in the packet forwarding component 990.

Figure 10:
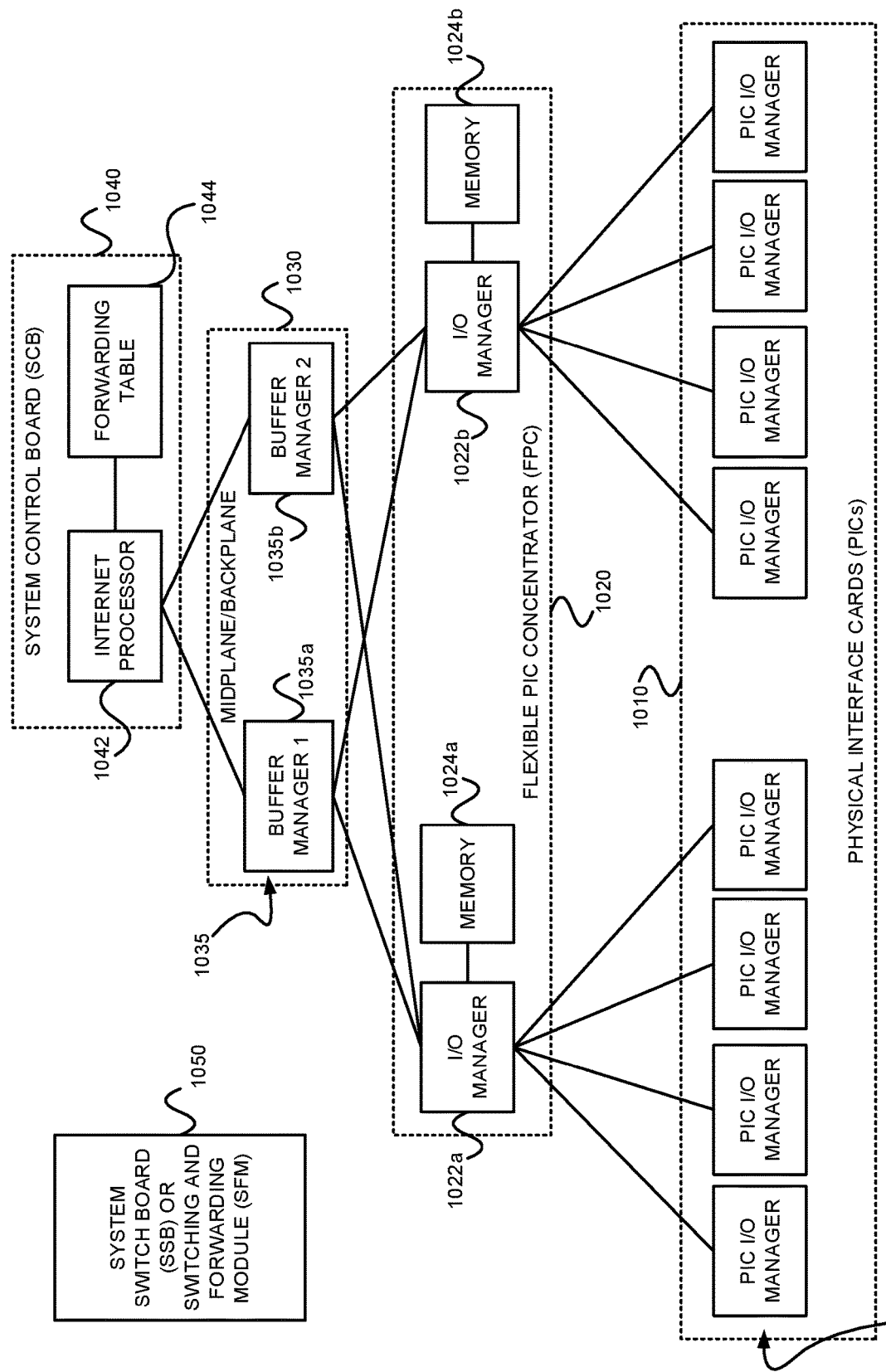
FIG. 10 is a block diagram of example distributed application specific integrated circuits ("ASICs") that may be provided in the example router of FIG. 9.

Referring back to distributed ASICs 994 of FIG. 9, FIG. 10 is an example of how the ASICS may be distributed in the packet forwarding component 990 to divide the responsibility of packet forwarding. As shown in FIG. 10, the ASICs of the packet forwarding component 990 may be distributed on physical interface cards ("PICs") 1010, flexible PIC concentrators ("FPCs") 1020, a midplane or backplane 1030, and a system control board(s) 1040 (for switching and/or forwarding). Switching fabric is also shown as a system switch board ("SSB"), or a switching and forwarding module ("SFM") 1050. Each of the PICs 1010 includes one or more PIC I/O managers 1015. Each of the FPCs 1020 includes one or more I/O managers 1022, each with an associated memory 1024. The midplane/backplane 1030 includes buffer managers 1035a, 1035b. Finally, the system control board 1040 includes an internet processor 1042 and an instance of the forwarding table 1044 (Recall, e.g., 996 of FIG. 9).

Still referring to FIG. 10, the PICs 1010 contain the interface ports. Each PIC 1010 may be plugged into an FPC 1020. Each individual PIC 1010 may contain an ASIC that handles media-specific functions, such as framing or encapsulation. Some example PICs 1010 provide SDH/SONET, ATM, Gigabit Ethernet, Fast Ethernet, and/or DS3/E3 interface ports.

An FPC 1020 can contain from one or more PICs 1010, and may carry the signals from the PICs 1010 to the midplane/backplane 1030 as shown in FIG. 10.

The midplane/backplane 1030 holds the line cards. The line cards may connect into the midplane/backplane 1030 when inserted into the example router's chassis from the front. The control component (e.g., routing engine) 910 may plug into the rear of the midplane/backplane 1030 from the rear of the chassis. The midplane/backplane 1030 may carry electrical (or optical) signals and power to each line card and to the control component 910.

The system control board 1040 may perform forwarding lookup. It 1040 may also communicate errors to the routing engine. Further, it 1040 may also monitor the condition of the router based on information it receives from sensors. If an abnormal condition is detected, the system control board 1040 may immediately notify the control component 910.

Referring to FIGS. 10, 11A and 11B, in some exemplary routers, each of the PICs 1010,910' contains at least one I/O manager ASIC 1015 responsible for media-specific tasks, such as encapsulation. The packets pass through these I/O ASICs on their way into and out of the router. The I/O manager ASIC 1015 on the PIC 1010,910' is responsible for managing the connection to the I/O manager ASIC 1022 on the FPC 1020,920', managing link-layer framing and creating the bit stream, performing cyclical redundancy checks (CRCs), and detecting link-layer errors and generating alarms, when appropriate. The FPC 1020 includes another I/O manager ASIC 1022. This ASIC 1022 takes the packets from the PICs 1010 and breaks them into (e.g., 64-byte) memory blocks. This FPC I/O manager ASIC 1022 sends the blocks to a first distributed buffer manager (DBM) 1035a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1035a' manages and writes packets to the shared memory 1024 across all FPCs 1020. In parallel, the first DBM ASIC 1035a' also extracts information on the destination of the packet and passes this forwarding-related information to the Internet processor 1042/942'. The Internet processor 1042/942' performs the route lookup using the forwarding table 1044 and sends the information over to a second DBM ASIC 1035b'. The Internet processor ASIC 1042/942' also collects exception packets (i.e., those without a forwarding table entry) and sends them to the control component 910. The second DBM ASIC 1035b' then takes this information and the 64-byte blocks and forwards them to the I/O manager ASIC 1022 of the egress FPC 1020/920' (or multiple egress FPCs, in the case of multicast) for reassembly. (Thus, the DBM ASICs 1035a' and 1035b' are responsible for managing the packet memory 1024 distributed across all FPCs 1020/920', extracting forwarding-related information from packets, and instructing the FPC where to forward packets.)

The I/O manager ASIC 1022 on the egress FPC 1020/920' may perform some value-added services. In addition to incrementing time to live ("TTL") values and re-encapsulating the packet for handling by the PIC 1010, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1022 on the egress FPC 1020/920' may be responsible for receiving the blocks from the second DBM ASIC 1035b', incrementing TTL values, queuing a pointer to the packet, if necessary, before applying CoS rules, re-encapsulating the blocks, and sending the encapsulated packets to the PIC I/O manager ASIC 1015.

Figure 12:
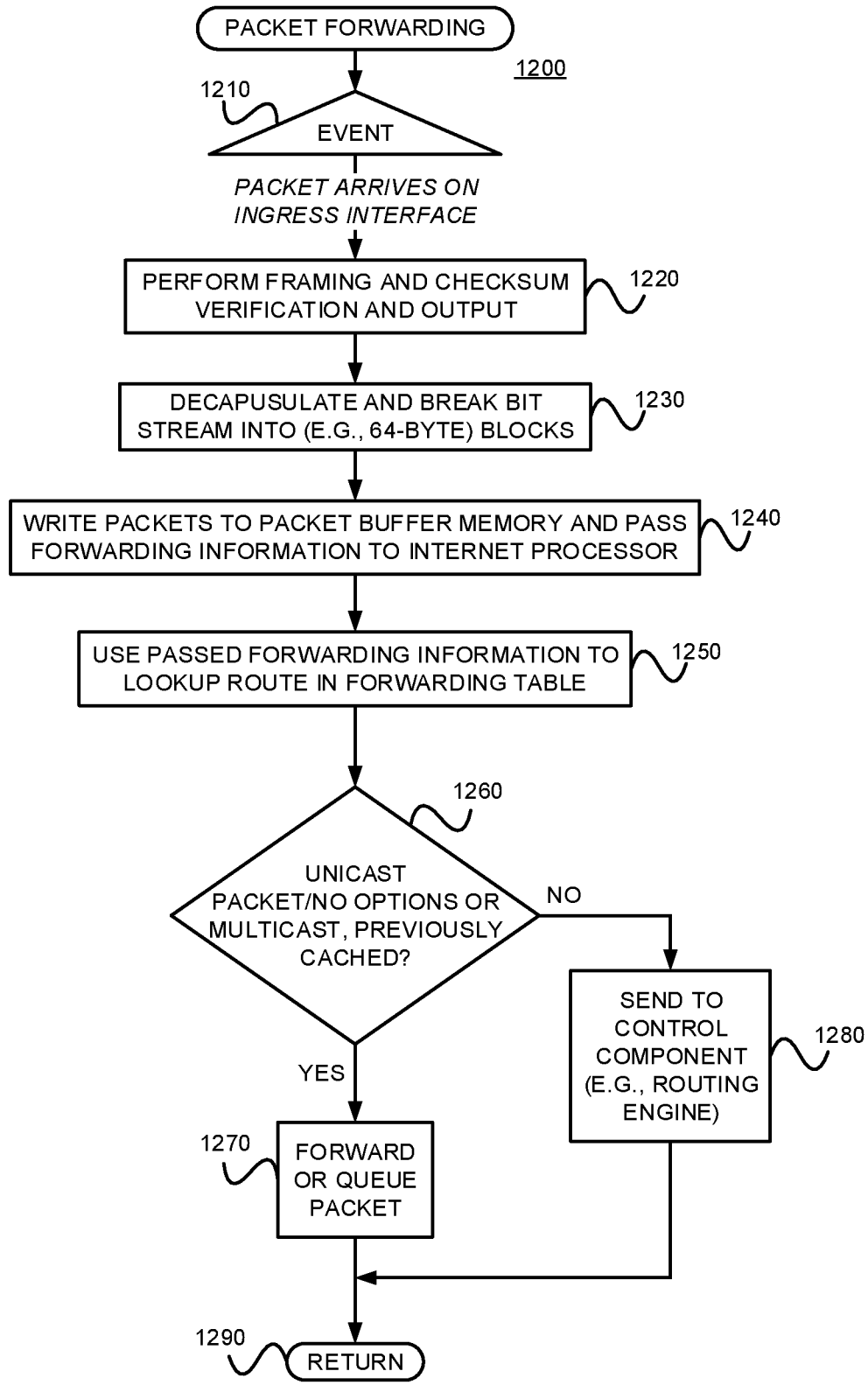
FIG. 12 is a flow diagram of an example packet forwarding method that may be implemented on any of the example routers of FIGS. 9 and 10.

FIG. 12 is a flow diagram of an example method 1200 for providing packet forwarding in the example router. The main acts of the method 1200 are triggered when a packet is received on an ingress (incoming) port or interface. (Event 1210) The types of checksum and frame checks that are required by the type of medium it serves are performed and the packet is output, as a serial bit stream. (Block 1220) The packet is then decapsulated and parsed into (e.g., 64-byte) blocks. (Block 1230) The packets are written to buffer memory and the forwarding information is passed on the Internet processor. (Block 1240) The passed forwarding information is then used to lookup a route in the forwarding table. (Block 1250) (Recall, e.g., FIGS. 7A-7D.) Note that the forwarding table can typically handle unicast packets that do not have options (e.g., accounting) set, and multicast packets for which it already has a cached entry. Thus, if it is determined that these conditions are met (YES branch of Decision 1260), the packet forwarding component finds the next hop and egress interface, and the packet is forwarded (or queued for forwarding) to the next hop via the egress interface (Block 1270) before the method 1200 is left (Node 1290) Otherwise, if these conditions are not met (NO branch of Decision 1260), the forwarding information is sent to the control component 910 for advanced forwarding resolution (Block 1280) before the method 1200 is left (Node 1290).

Referring back to block 1270, the packet may be queued. Actually, as stated earlier with reference to FIG. 10, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1022 may send a request for the packet to the second DBM ASIC 1035b. The DBM ASIC 1035 reads the blocks from shared memory and sends them to the I/O manager ASIC 1022 on the FPC 1020, which then serializes the bits and sends them to the media-specific ASIC of the egress interface. The I/O manager ASIC 1015 on the egress PIC 1010 may apply the physical-layer framing, perform the CRC, and send the bit stream out over the link.

Referring back to block 1280 of FIG. 12, as well as FIG. 10, regarding the transfer of control and exception packets, the system control board 1040 handles nearly all exception packets. For example, the system control board 1040 may pass exception packets to the control component 910.

Referring back to block 1250 of FIG. 12, the example method 500 may be implemented within this block. The forwarding tables (Recall, e.g., 980 and 996 of FIG. 9) may include information such as that described with reference to FIGS. 7A-7D.

Although example embodiments consistent with the present disclosure may be implemented on the example routers of FIG. 8 or 9, embodiments consistent with the present disclosure may be implemented on communications network nodes (e.g., routers, switches, etc.) having different architectures. More generally, embodiments consistent with the present disclosure may be implemented on an example system 1300 as illustrated on FIG. 13.

Figure 13:
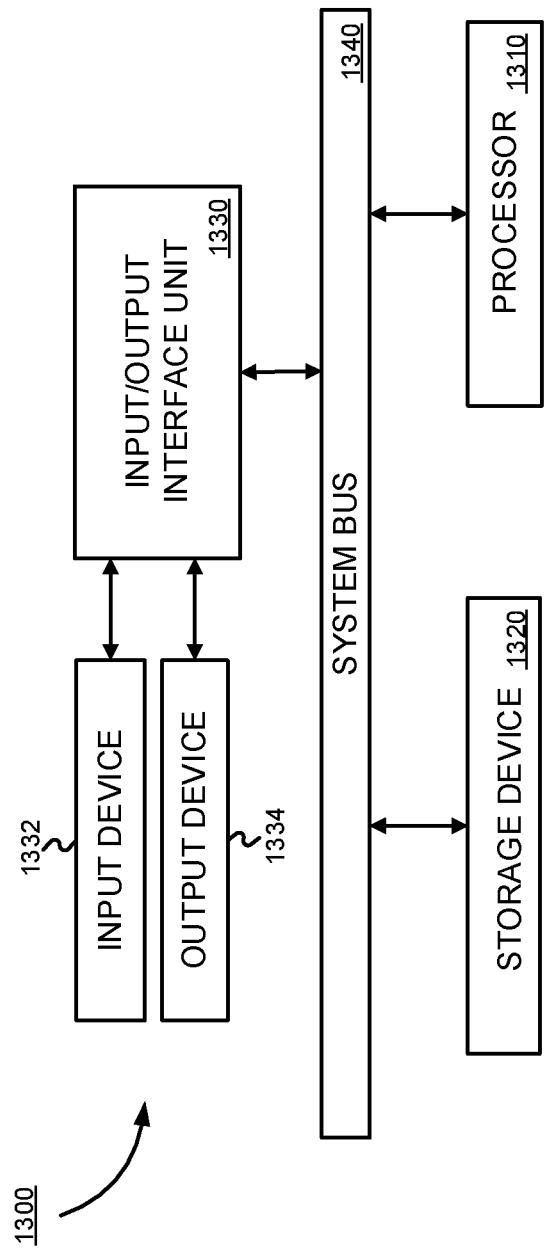
FIG. 13 is a block diagram of an example processor-based system that may be used to execute the example methods for processing an egress packet and/or to store information used and/or generated by such example methods.

FIG. 13 is a block diagram of an exemplary machine 1300 that may perform one or more of the methods described, and/or store information used and/or generated by such methods. The exemplary machine 1300 includes one or more processors 1310, one or more input/output interface units 1330, one or more storage devices 1320, and one or more system buses and/or networks 1340 for facilitating the communication of information among the coupled elements. One or more input devices 1332 and one or more output devices 1334 may be coupled with the one or more input/output interfaces 1330. The one or more processors 1310 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1320 and/or may be received from an external source via one or more input interface units 1330. The machine executable instructions may be stored as various software modules, each module performing one or more operations. Functional software modules are examples of components which may be used in the apparatus described.

In some embodiments consistent with the present disclosure, the processors 1310 may be one or more microprocessors and/or ASICs. The bus 1340 may include a system bus. The storage devices 1320 may include system memory, such as read only memory (ROM) and/or random access memory (RAM). The storage devices 1320 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 Refinements and Alternatives

Although described as routers and/or switches, nodes may represent other types of devices capable of performing the foregoing node operations.

Referring back to block 520 of FIG. 5A, in some example methods consistent with the present description, the act of determining a next hop and an egress interface may include performing a single lookup using the destination information and the interface on which the datagram was received to select the egress interface and a next hop (e.g., in a single lookup operation).

§ 4.5 Conclusion

As should be appreciated from the foregoing, example methods and apparatus consistent with the present disclosure reduce or eliminate routing micro-loops in networks having a (CLOS topology, such as data center CLOS networks employing the exterior border gateway protocol (eBGP) for example.

What is claimed is:

1. A computer-implemented method for reducing or eliminating routing micro-loops in a network having a CLOS topology in which nodes of the network are arranged in at least three (3) tiers, the computer-implemented method comprising:
   a) receiving, on an interface of one of the nodes of the network having the CLOS topology, a datagram, the datagram including destination information, wherein the one of the nodes belongs to one of the at least three tiers;
   b) determining, by the one of the nodes, a next hop and an egress interface using (1) an identifier of the interface on which the datagram was received, (2) the destination information of the received datagram, and (3) stored forwarding information such that a routing loop including the one of the nodes and another node in a tier of the CLOS topology adjacent to the one of the at least three tiers is avoided without discarding the datagram by ensuring that a next hop interface is different from the interface on which the datagram was received; and
   c) forwarding the datagram via the egress interface.

2. The computer implemented method of claim 1 wherein the act of determining a next hop and an egress interface includes performing a single lookup using the destination information and the interface on which the datagram was received to select the egress interface and a next hop.

3. The computer implemented method of claim 1 wherein the act of determining a next hop and an egress interface includes
   1) looking up, using the destination information of the received datagram and the stored forwarding information, a preliminary next hop egress interface on the node,
   2) determining whether or not the preliminary next hop egress interface on the node is the same as the interface on which the datagram was received, and
   3) responsive to a determination that the preliminary next hop egress interface on the node is the same as the interface on which the datagram was received,
      replacing the preliminary next hop egress interface with a safe multipath next hop egress interface for use as the egress interface, wherein at least one safe multipath next hop egress interface is stored in association with the preliminary egress next hop interface, and wherein each of the at least one safe multipath next hop egress interface is different from the preliminary egress next hop interface, and
   otherwise, responsive to a determination that the preliminary next hop egress interface on the node is not the same at the interface on which the datagram was received,
      using the preliminary next hop interface as the egress interface.

4. The computer-implemented method of claim 3 wherein it has been determined that the next hop egress interface on the node is the same as the interface on which the datagram was received, and wherein the act of replacing the next hop egress interface with a safe multipath next hop egress interface includes selecting one of a plurality of safe next hop interfaces in such a manner that the plurality of safe next hop interfaces are selected with an even distribution.

5. The computer-implemented method of claim 3 wherein it has been determined that the next hop egress interface on the node is the same as the interface on which the datagram was received, and wherein the act of replacing the next hop egress interface with a safe multipath next hop egress interface includes selecting one of a plurality of safe next hop interfaces in a round-robin manner.

6. The computer-implemented method of claim 3 wherein it has been determined that the next hop egress interface on the node is the same as the interface on which the datagram was received, and wherein the act of replacing the next hop egress interface with a safe multipath next hop egress interface includes selecting one of a plurality of safe next hop interfaces randomly.

7. The computer-implemented method of claim 3 wherein it has been determined that the next hop egress interface on the node is the same as the interface on which the datagram was received, and wherein the act of replacing the next hop egress interface with a safe multipath next hop egress interface includes selecting one of a plurality of safe next hop interfaces, each of which is stored on the node in association with a prefix matching the destination information.

8. The computer-implemented method of claim 1 wherein the destination information is a layer-3 destination address.

9. The computer-implemented method of claim 1 wherein one of the least three tiers is a top-of-rack tier, and wherein the destination information is a layer-3 destination address of a server linked with at least one node of the top-of-rack tier.

10. The computer-implemented method of claim 9 wherein the one of the nodes is located in a tier other than the top-of-rack tier.

11. The computer-implemented method of claim 1 wherein the nodes of the network run a border gateway protocol (BGP).

12. The computer-implemented method of claim 1 wherein the nodes of the network run an exterior border gateway protocol (eBGP).

13. A node provided in a network having a CLOS topology in which nodes of the network are arranged in at least three (3) tiers, the node of the network having the CLOS topology belonging to one of the at least three tiers and comprising:
   a) an interface for receiving a datagram, the datagram including destination information;
   b) a storage medium storing forwarding information; and
   c) a forwarding engine configured to
      determine, by the node, a next hop and an egress interface using (1) an identifier of the interface on which the datagram was received, (2) the destination information of the received datagram, and (3) the forwarding information stored, such that a routing loop including the one of the nodes and another node in a tier of the CLOS topology adjacent to the one of the at least three tiers is avoided without discarding the datagram by ensuring that a next hop interface is different from the interface on which the datagram was received, and
      forward the datagram via the egress interface.

14. The node of claim 13 wherein the forwarding engine determines the next hop and the egress interface by performing a single lookup using the destination information and the interface on which the datagram was received to select the egress interface and the next hop.

15. The node of claim 13 wherein the forwarding engine determines the next hop and the egress interface by (1) looking up, using the destination information of the received datagram and the forwarding information stored, a preliminary next hop egress interface on the node, (2) determining whether or not the preliminary next hop egress interface on the node is the same as the interface on which the datagram was received, and (3) responsive to a determination that the preliminary next hop egress interface on the node is the same as the interface on which the datagram was received, replacing the preliminary next hop egress interface with a safe multipath next hop egress interface for use as the egress interface, wherein at least one safe multipath next hop egress interface is stored in association with the preliminary egress next hop interface, and wherein each of the at least one safe multipath next hop egress interface is different from the preliminary egress next hop interface, and otherwise, responsive to a determination that the preliminary next hop egress interface on the node is not the same at the interface on which the datagram was received, using the preliminary next hop interface as the egress interface.

16. The node of claim 15 wherein when the forwarding engine has been determined that the next hop egress interface on the node is the same as the interface on which the datagram was received, the forwarding engine is configured to replace the next hop egress interface with a safe multipath next hop egress interface by selecting one of a plurality of safe next hop interfaces in such a manner that the plurality of safe next hop interfaces are selected with an even distribution.

17. The node of claim 16 wherein the forwarding engine is configured to replace the next hop egress interface with a safe multipath next hop egress interface by either (A) selecting one of a plurality of safe next hop interfaces in a round-robin manner, or (B) selecting one of a plurality of safe next hop interfaces randomly with equal weight.

18. The node of claim 13 wherein the destination information is a layer-3 destination address of a server linked with at least one top-of-rack node of the network.

19. A non-transitory computer-readable medium storing processor executable instructions which, when executed by at least one processor, cause the at least one processor to perform a method for reducing or eliminating routing microloops in a network having a CLOS topology in which nodes of the network are arranged in at least three (3) tiers, the method comprising:

a) receiving, on an interface of one of the nodes of the network having the CLOS topology, a datagram, the datagram including destination information, wherein the one of the nodes belongs to one of the at least three tiers;

b) determining, by the one of the nodes, a next hop and an egress interface using (1) an identifier of the interface on which the datagram was received, (2) the destination information of the received datagram, and (3) stored forwarding information such that a routing loop including the one of the nodes and another node in a tier of the CLOS topology adjacent to the one of the at least three tiers is avoided without discarding the datagram by ensuring that a next hop interface is different from the interface on which the datagram was received; and c) forwarding the datagram via the egress interface.

* * * * *